United States Patent [19]

Courter

[11] 4,154,237

[45] May 15, 1979

[54] PASSENGER EMERGENCY OXYGEN MASK DROP ZONE EXTENDER

[75] Inventor: Jack P. Courter, Seattle, Wash.

[73] Assignee: Boeing Commercial Airplane Company, Seattle, Wash.

[21] Appl. No.: 864,563

[22] Filed: Dec. 27, 1977

[51] Int. Cl.² ............................................. A62B 7/14
[52] U.S. Cl. ............................. 128/203; 244/118 P; 128/146.3
[58] Field of Search .......... 128/203, 205, 202, 142 R, 128/142.4, 142.3, 145 R, 146.3, 204; 244/118 P; 222/530

[56] References Cited

U.S. PATENT DOCUMENTS

| 3,102,607 | 9/1963 | Roberts | 244/118 P |
| 3,981,302 | 9/1976 | Veit | 128/203 |

*Primary Examiner*—Henry J. Recla

*Attorney, Agent, or Firm*—H. Gus Hartmann; Bernard A. Donahue

[57] ABSTRACT

The passenger flying in today's high altitude commercial jet airplanes is generally seated in a pressurized compartment which in some airplanes has an overhead passenger service unit that houses emergency oxygen masks which are automatically deployed in the event of cabin depressurization. For high density abreast seating arrangements, the passengers seated in the aisle seats may be outside of the reach radius for the emergency oxygen mask drop zone from the overhead storage unit. Therefore, the present invention relates to apparatus comprising a spring cartridge extension device for laterally extending the required number of oxygen masks, upon release of the door to the oxygen mask container; and positioning them over the abreast seating arrangements, so that an oxygen mask is within the reach of each of the seated passengers.

3 Claims, 6 Drawing Figures

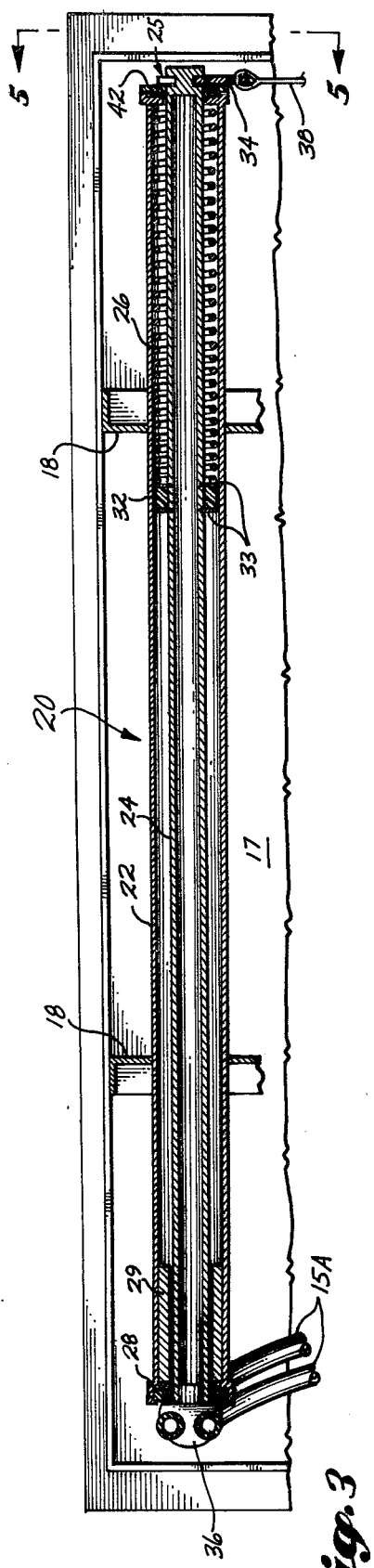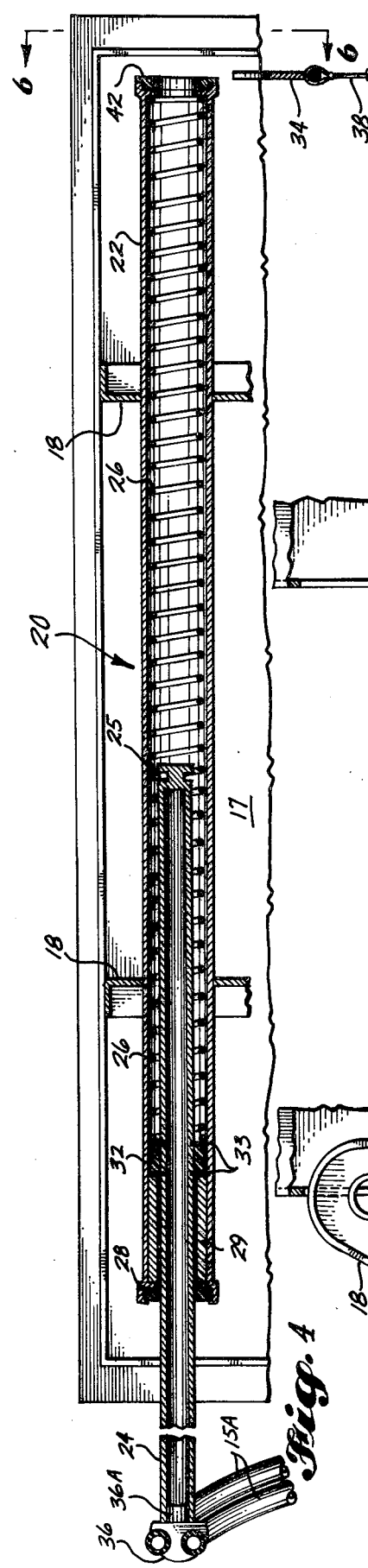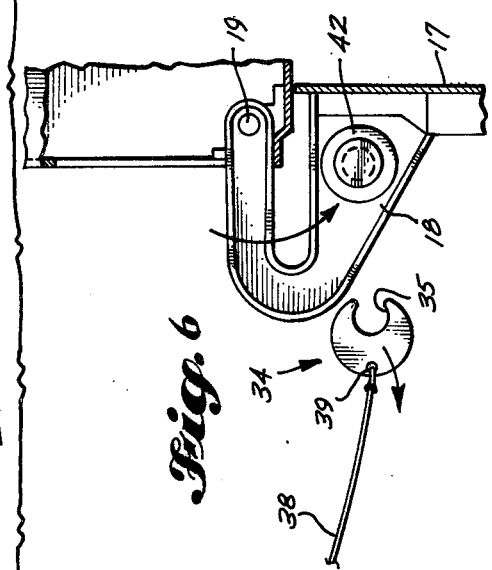

4,154,237

PASSENGER EMERGENCY OXYGEN MASK DROP ZONE EXTENDER

SUMMARY OF THE INVENTION

The pressurized passenger compartment of some of the present known commercial jet airplanes have overhead passenger service units which contain emergency oxygen masks for passenger use in the event of cabin depressurization at high altitude.

For the present known wide-body airplanes such as the Boeing 747, Lockheed L-1011 and McDonnell Douglas DC-10, if a high density seating arrangement, such as eleven-abreast, were to be utilized, the passengers seated in the aisle seats may be outside the grasp of the existing overhead dropped oxygen masks. Therefore, the present invention relates to an extension device which is intended to laterally displace a certain number of oxygen masks so that they are within easy reach of the aisle seated passenger.

An advantage of the present invention is that the existing overhead passenger service unit assemblies may be modified to incorporate the necessary additional components and still retain their existing locations.

Another advantage is that the overall stowage area for the emergency oxygen masks can be compressed from a space saving standpoint, without jeopardizing the extensive overhead hanging deployment area required for the oxygen masks.

Another advantage is in the simplicity of the extension device and the absence of any mechanism or linkage between the initiator and the resultant motion, which provides for the highest possible degree of reliability.

An object of the present invention is to position an emergency oxygen mask from an overhead stowage area, such that it is within the normal reach radius of a seated passenger in an airplane compartment.

Another object is to make the deployment of the emergency oxygen mask the most reliable device that can be conceived.

BRIEF DESCRIPTION OF THE DRAWINGS

FIGS. 3 and 4 are cross-sectional views of one of the dual spring-cartridge, oxygen mask extender units shown in FIG. 2 attached to the backside of the PSU oxygen mask stowage container door, with an extendible rod shown in the retracted and extended positions respectively.

FIG. 5 is an end view of FIG. 3 taken in the direction indicated by 5—5.

FIG. 6 is an end view of FIG. 4 taken in the direction indicated by 6—6.

DESCRIPTION OF THE PREFERRED EMBODIMENT

Figure 1:
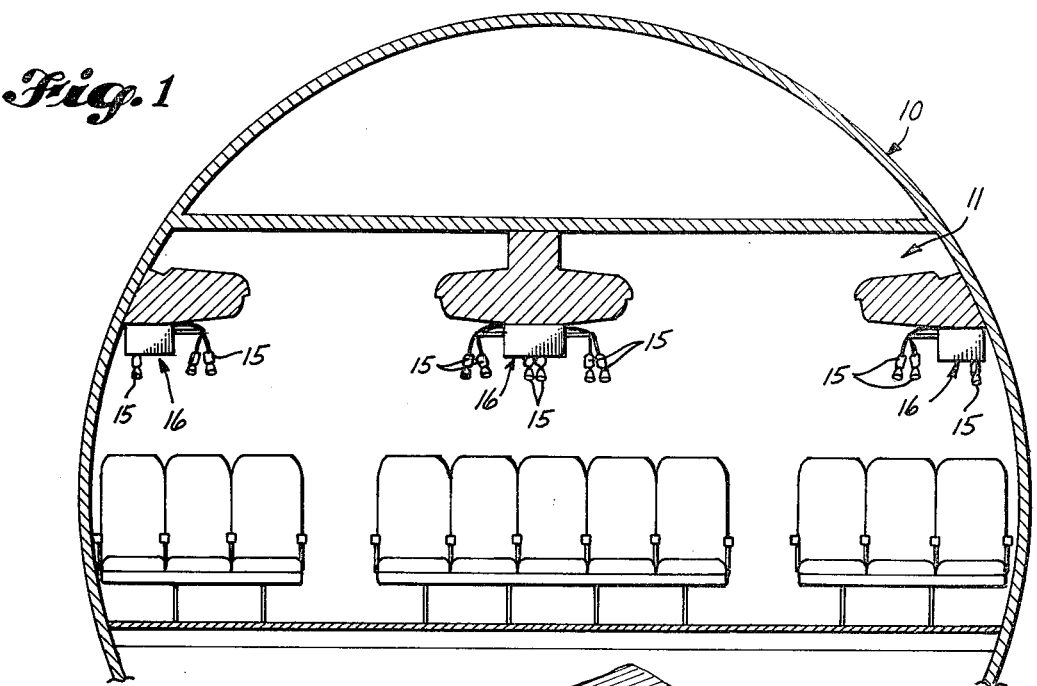
FIG. 1 is a cross-sectional view of an aircraft fuselage with an eleven-abreast seating arrangement being accommodated by overhead passenger service units for the overhanging extension of emergency oxygen masks.

FIG. 1 is a cross-sectional view of an aircraft fuselage 10 depicting an eleven-abreast seating arrangement in the passenger compartment 11, with a five-place passenger seat located symmetrically about the longitudinal centerline of the fuselage 10. The passengers seated in the aisle seats, especially when a five-breast passenger seat is used, may be outside the reach of the emergency oxygen masks 15 or their drop zone from the overhead passenger service unit 16, hereinafter abbreviated as PSU, which may not be centered with respect to the width of the passenger compartment. Therefore, the apparatus of the present invention relates to the positioning of the emergency oxygen masks 15 so that they are within the grasp of each seated passenger, i.e., within a required thirty-five inch reach radius. The emergency oxygen mask, when deployed, must be located within a cylindrically shaped drop zone having a thirty-five inch radius which is centered on the seat reference point. The seat reference point is defined as the intersection of the following: the seat cushion, the seat back, and the seat back centerline.

Figure 2:
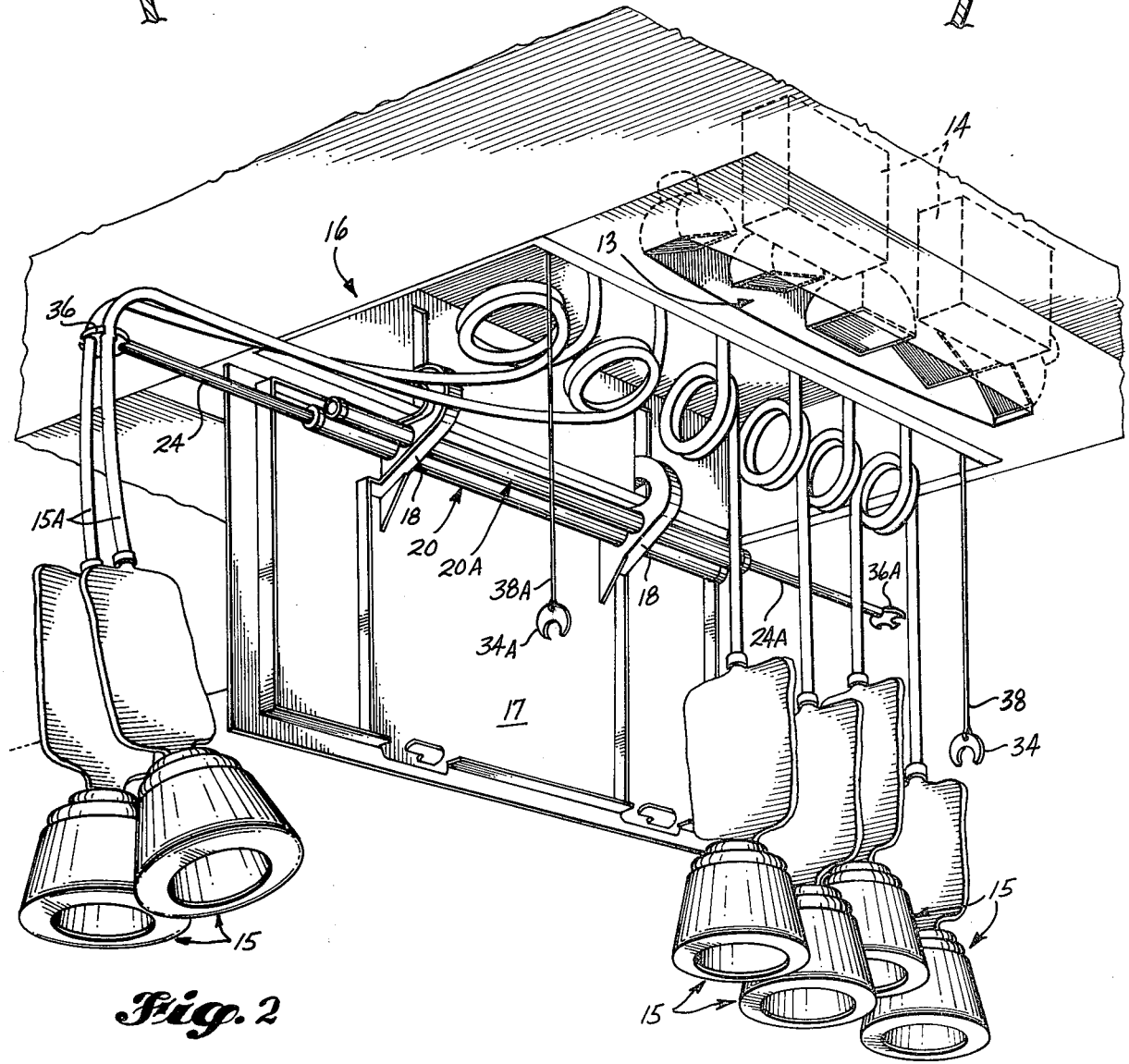
FIG. 2 is a lower perspective view of the central overhead PSU (passenger service unit) shown in FIG. 1, which provides for the dispersal of a required six oxygen masks for the central five-abreast seating arrangement.

FIG. 2 is a perspective view of the central overhead PSU (passenger service unit) 16 shown in FIG. 1, for accommodating the five-abreast seating arrangement which requires stowage for six emergency oxygen masks 15.

The central PSU is an assembly which incorporates: a six-place oxygen manifold with six emergency oxygen masks 15; a five-unit reading lamp assembly 13; and two PSU decoders 14 for the environmental system.

In order to provide the most reliable device for deployment of the emergency oxygen masks 15, there must be the fewest number of parts in its functional logic or in the sequence of its operation; because, reliability depends upon the number of logic gates that have to be opened sequentially. Therefore, of primary concern in the selection of a device for providing the power for the extension function, is the consideration of whether it will be available or fire even if there is a failure in fabrication; and the result of such analysis is the selection of a compression spring for providing the necessary stored energy.

The container 16 for stowage of the six emergency oxygen masks 15, which are required for the five-abreast seating, houses dual spring-cartridge, oxygen mask extender units 20, 20A, which are mounted onto the gooseneck type hinge arms 18 of the door 17 for the oxygen mask stowage container 16. When the door 17 has rotated through approximately sixty degrees of travel, the lanyards 38, 38A, which are dead-ended on the oxygen container housing 16, pull the triggers or teflon keepers 34, 34A; thereby, releasing the compression spring force for laterally extending the rods 24, 24A. When deployed, the rods 24, 24A, will laterally extend the oxygen masks 15 which are carried at the outer ends thereof at 36, thus placing them within a thirty-five inch reach radius for the seated passengers.

FIGS. 3 and 4 are cross-sectional views of one of the oxygen mask extension units 20 with the extension rod 24 shown in the retracted and extended positions respectively. The cylinder 22 of the extender unit 20 is mounted on the gooseneck hinge arm 18 of the door 17 for the oxygen mask stowage container 16. A spring-loaded extension rod 24 is housed within a tube or cylinder 22. The rod 24 has a hose retainer 36 on its outer end onto which two oxygen mask hoses 15A are held; and the outer end of the rod 24 has an annular slot 25 for the insertion of a circular shaped retainer or keeper 34. When the teflon keeper 34 is inserted into the groove or slot 25 at the end of the rod 24 to retain the rod 24 in the retracted position and the spring 26 in the compression loaded condition, as shown in FIG. 3, it also bears against a teflon bearing at the inner end of the cylinder 22. When the door 17 has rotated through approximately sixty degrees of travel, the lanyard 38, which is dead-ended on the oxygen container housing 16, pulls the teflon trigger or keeper 34 out of the groove or slot 25 at the inner end of the rod 24; thereby, releasing the compression force of the spring 26, and laterally extending the rod 24 with the attached oxygen mask hoses 15A.

A teflon ring slider 32, is attached to the rod 24 through snap rings 33 at either end thereof, and the teflon ring slider 32 abuts and compresses the spring 26 when the rod 24 is in the retracted position shown in FIG. 3. A teflon sleeve bearing 29 is interposed between the inner front end of cylinder 22 and the rod 24 for centering the rod within the cylinder, and the bearing 29 also functions as an abutment stop means for the extending rod 24.

FIGS. 5 and 6 are end views of FIGS. 3 and 4 respectively, and show in greater detail the trigger or keeper 34. The external shape of the keeper 34 is basically a circular disk wherein one quadrant of the circle is utilized for a cutout 35 that engages the rod end slot 25. So there is an eccentricity relationship between the center of the circular cutout 35 and the peripheral attachment point 39 of the lanyard 38 so that there is a moment about the center of the circular cutout 35 when the tension is applied to the lanyard 38. Also, due to the position of the cutout 35, a pincer-like shape is formed on the keeper 34 which requires a slight force for snapping it over the rod end slot 25 and thereby aids in retaining the keeper in place.

The cylinder end cap has a teflon insert 42, so that a non-binding or sliding action takes place between it and the teflon keeper 34. The triggering mechanism, for a better friction coefficient, utilizes the sliding action of teflon against teflon, as opposed to possibly a cotter pin type, which would make a difference; in addition, the lanyard could get looped around the rod or get snagged on the cotter pin while the oxygen masks were in the stowed position, so that the device would not function properly.

Although unlikely, vibration might cause the keeper 34 to release the extension rod 24; however, when the keeper 34 is in its proper position in the rod end slot 25, the action of the compression spring 26, between the rod end slot 25 and the cylinder end teflon bearing 42, causes a bearing force therebetween, which acts to retain the teflon keeper 34 in position. So there would have to be a great deal of vibration working against that arrangement to let the teflon keeper 34 pop out of the groove or slot 25. But, if it ever were to work loose, the extendible end of the device is so made that as the door 17 opens, the rod 24 will still extend satisfactorily. The rod end holding the oxygen mask hoses 15A, has a hose retainer 36 which has a blunt rounded end or bullnose and is made of teflon. So that if the keeper 34 has accidentally released the extension rod 24, and as a result of compartment decompression the door 17 is released to open downward, the rod-end teflon bullnose retainer 36 will slide down the inside wall of the box until it is free and then the rod 24 will extend satisfactorily; because, the inside wall of the box does not have a lip or any other type of protrusion that would obstruct the extension rod 24 from comming out. This is one of the considerations that had to be made, in that there definitely doesn't want to be a lip or any obstruction to the device as it comes down and out.

The teflon bullnose hose retainer 36 has a short stub portion 36A for insertion into the end of the tubular rod 24, so that hoses 15A of the oxygen masks 15 will not hang up in the event that someone reached up and grabbed them; e.g., if two persons at once were each to grab one of the two oxygen masks suspended from the same retainer 36, there would be an equal force applied to each side of the retainer 36 so that it could not rotate quickly enough to permit the hoses to be released from its grasp. Therefore, if there is just a short amount of engagement 36A with the end of the tubular rod 24, then the entire retainer element 36 could pop out like a cork. Further, a structural fuse could be put between the end of the rod 24 and the hose retainer 36, such that should someone reach up and grab a mask and the hose retainer 36 not rotate quickly enough to permit the hose to be released from its grasp and thereby hang up, that the retainer 36 would break loose from the end of the rod.

What is claimed is:

1. Apparatus for laterally distributing emergency oxygen masks over an abreast passenger seating arrangement in the pressurized passenger compartment of an airplane, comprising: a passenger service unit having a stowage compartment for emergency oxygen masks; said passenger service unit adapted to be located overhead of the abreast passenger seating arrangement; said oxygen mask stowage compartment having a downward opening hinged door having means for opens automatically opening said door in response to passenger compartment depressurization; a spring-cartridge extension means mounted laterally to the inside of the stowage compartment door for laterally extending emergency oxygen masks over the abreast seating arrangement upon the automatic downward opening of the hinged door.

2. In a distributing emergency oxygen mask system for distributing emergency oxygen masks over an abreast seating arrangement in a pressurized passenger compartment of an airplane having an overhead passenger service unit housing the emergency oxygen masks and having a door that opens in response to accidental decompression of the passenger compartment; the improvement comprising a linear actuator mounted laterally to the inside of said door and having a spring-armed extendible rod; a trigger means for retaining said rod in the armed condition; means for holding an emergency oxygen mask from the extendible end of said rod; and means for triggering the spring-armed extendible rod in response to opening of the door, for extending the emergency oxygen mask held by said rod, to within the normal reach radius of passengers in the abreast seating arrangement that are outside of the vertical drop zone of the emergency oxygen masks from the overhead passenger service unit.

3. Apparatus for laterally extending an emergency oxygen mask over an abreast seating arrangement in the pressurized passenger compartment of an airplane, comprising: a passenger service unit having a stowage compartment for emergency oxygen masks; said passenger service unit adapted to be stationed overhead the abreast seating arrangement; said oxygen mask stowage compartment having a downward opening hinged door including means for automatically opening said door in response to passenger compartment depressurization; a spring-cartridge extension unit integrally and laterally affixed to the inside of the compartment door and having a spring-armed extendible rod; a keeper for retaining said rod in the armed condition; a hose retainer attached to the extendible end of said rod for holding the hose of an oxygen mask; and means for releasing the spring-armed extendible rod in response to opening of the compartment door, for extending the emergency oxygen mask over the abreast seating arrangement.

* * * * *